April 10, 1945.  C. S. COCKERELL  2,373,168
GRADUATED SCALE INDICATOR, SUCH AS MAY BE USED
AS TUNING SCALES FOR RADIO-RECEIVERS
Filed Aug. 8, 1942
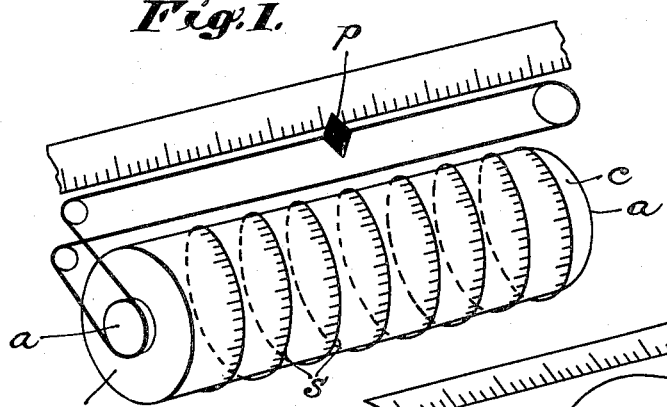
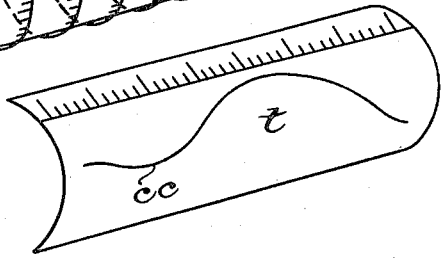
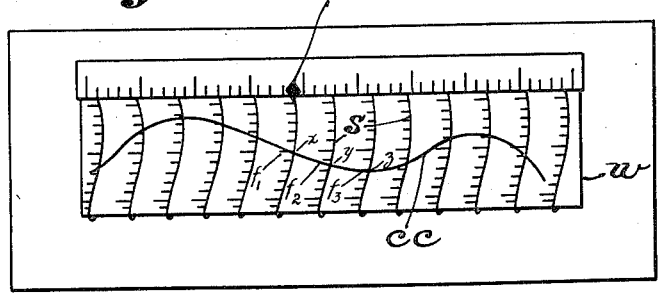
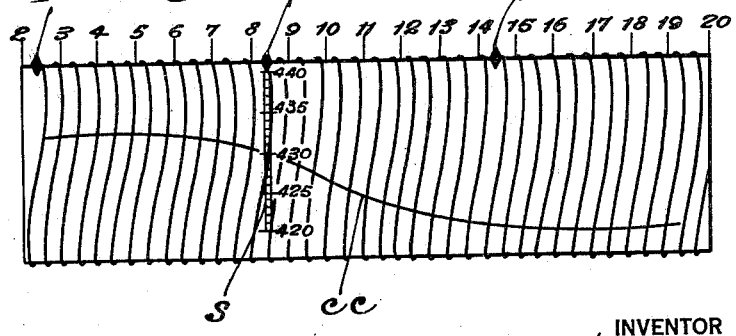
INVENTOR
Christopher Sydney Cockerell
BY
ATTORNEY Patented Apr. 10, 1945

2,373,168

UNITED STATES PATENT OFFICE 2,373,168

GRADUATED SCALE INDICATOR, SUCH AS MAY BE USED AS TUNING SCALES FOR RADIO RECEIVERS

Christopher Sydney Cockerell, Chelmsford, England, assignor to Radio Corporation of America, a corporation of Delaware Application August 8, 1942, Serial No. 454,154
In Great Britain August 12, 1941

2 Claims. (Cl. 116—124.1)

The present invention relates to graduated scale indicators, such as may be used as tuning scales for radio receivers, though it should be appreciated that the invention may be used in connection with other apparatus wherein it may be found useful. For convenience, the invention will be described as for use with the tuning of radio receivers.

In modern radio-receivers of high discrimination closely graduated scales of considerable length may be provided so that the frequency to which the receiver may be tuned may be indicated to a high degree of precision. Such scales may be provided helically on a cylinder, spirally on a disc, or obliquely and rectilinearly on a band, the member carrying the graduated scale being so mounted that as the scale-bearing member passes through a viewing window, the graduated scale moves relatively to a cursor line, both across the cursor line and along the length of the cursor line. The graduation of the scale is effected in accordance with a known law.

Where such receivers are required in large quantities it is not commercially practicable to calibrate each scale individually and there is, therefore, a definite maximum length of scale which can be usefully employed for any given set of tolerances of the components which go to make up the receiver. Using commercial tolerances for the components the discrimination of such a scale leaves much to be desired, and therefore it is necessary to provide a correction to the indications given by a scale of such a length as to give adequate discrimination.

According to the invention a graduated-scale indicator of the kind in which a long graduated scale is so mounted, relatively to a cursor line, that in adjusting the scale relatively to the said cursor line the scale moves across the cursor line and also along the length of the cursor line so that successive graduation marks are read against successive points in the length of the cursor line, is characterised in this, that the cursor line is fixed and is curved or shaped in accordance with ascertained errors, so as to correct for such errors.

The correction curson line may be traced upon a transparent cover with which the viewing window is provided, or it may be cut in a thin sheet of opaque material (for example metal) the graduation marks in either case being read at the point of intersection of the graduated scale line and correction cursor line.

Where the graduated scale line is traced several times around a cylinder, or as a spiral of several turns on a disc, so that it appears as a plurality of parallel lines in the window an additional travelling pointer may be provided to indicate on which of these parallel lines a reading is to be made.

The correction curve is obtained by calibrating the receiver at a suitable number of selected points on the scale.

The axis by which the graduated cylinder disc or band is set in motion will usually require to be connected to the axis of the tuning element through a gear train so that it may make several turns to one turn of the latter.

The invention is illustrated, by way of example in the accompanying drawing wherein Figs. 1 to 3 disclose a particular embodiment, Fig. 1 showing the scale inscribed on a cylinder, Fig. 2 showing the transparent cover plate that is adapted to be positioned in front of the cylinder, and Fig. 3 showing the assembly of Figs. 1 and 2 behind a window in a panel; and Fig. 4 discloses an embodiment of the invention adapted for use in a multi-band receiver.

In the embodiment of Figs. 1 to 3 the graduated scale $s$ is engraven, or otherwise marked in accordance with a known law, helically upon a cylinder $c$ mounted, for rotation about its axis $a$, adjacent to a window $w$ of a length substantially equal to the length of that part of the cylinder over which the helix extends. The line on the cylinder thus presents the appearance of a plurality of short parallel lines extending across the width of the window and set obliquely to the shortest line across the width. Rotation of the cylinder causes these appparent short lines to move both along the length of the window and across the width thereof. The window is closed by means of a transparent covering $t$, which may be flat but preferably, and as shown in Figure 2, is curved so as to conform with the shape of the cylinder. Traced upon this transparent cover is a correction curve $cc$ which is obtained by calibrating the receiver at a suitable number of points on the scale. The cylinder is geared to the tuning handle of the radio-receiver through a gear train (not shown) so that it may make a number of revolutions to one complete cycle of adjustment of the tuning member, the number of revolutions depending upon the number of convolutions of the scale line $s$. Also geared with the tuning handle, or, as shown, to the axle of the cylinder is a pointer $p$ so mounted relatively to the window, that for one complete cycle of adjustment of the tuning member, the pointer makes one complete traverse of the length of the window, being thereby always associated with the (apparent) individual line of the scale appropriate to the adjustment temporarily in being.

The calibration or correction cursor line cc is obtained in the following manner. In the shown position of adjustment of the receiver tuning means, as indicated by the pointer P (Fig. 3), the known received frequency as indicated by the graduation on the scale S is $f_1$. The point $x$ on the transparent cover $t$ that coincides with the scale graduation $f_1$ determines the point on the curve cc to which the scale S must be moved at future times in order to adjust the receiver to the frequency $f_1$ with precision. Similarly, the tuning means will be adjusted to other known frequencies $f_2$, $f_3$ and others, throughout its range, and the corresponding points $y$, $z$, etc. are then marked on the transparent cover $t$, the curve cc representing the locus of all points thus obtained.

There may be, if the scale is used in connection with a radio-receiver serving a plurality of ranges, a like plurality of pointers $p'$, $p''$, $p'''$, Figure 4, each pointer operating over an appropriate section of the scale, and each made operative as by illumination either of itself, or of the section of the scale, as the range of the receiver is changed. In Figure 4, which relates to such an arrangement, the reading is 8,430,000 c./s. (or 8.430 mc./s.).

The invention is of particular value when employed in connection with a self-calibrating radio-receiver.

Such a radio receiver, for instance a superheterodyne receiver, is provided with a local oscillator the frequency of which is of a high degree of constancy, and which has been adjusted to a predetermined value. As is usually the case in such oscillators, there are associated with the fundamental frequency a large number of harmonics which will, of course, be of known frequencies. One such receiver circuit is described in provisional specification No. 6744/41. The fundamental frequency of a local oscillator or a harmonic frequency is coupled to the input circuit of the receiver and induces signals therein. The receiver circuits are then tuned to this frequency. The point on the calibration scale corresponding to the known frequency of the induced oscillations gives one point on the correction cursor-line, and by repeating the process with the other harmonic frequencies the complete correction curve may be traced.

The positions on the scale corresponding to these frequencies may be marked in a distinctive manner so that a check on the constancy of calibration can be made by setting them against the cursor mark and noting whether the tuning is correct. The receiver may be provided with trimmer condensers to correct for any errors of tuning thus found.

The invention is also of particular value when employed in connection with a self-checking receiver, for instance of the superheterodyne type. Such a receiver is provided with a local oscillator constructed to have a frequency of oscillation which is maintained constant within narrow limits and of predetermined frequency. In addition to the fundamental frequency this local oscillator generates a large number of harmonic multiples thereof which fall upon points of the calibration of the receiver.

It is not thought to be necessary to describe in any detail, the manner in which the invention may be applied to a spiral scale on a disc. The correction cursor line, of course, in this arrangement will have a direction generally radially of the disc which will be mounted for rotation about the centre of the spiral line. A pointer may be provided in this arrangement also.

A band type indicator is so generally similar to a cylinder type that it is not thought necessary to describe the manner of its construction.

Having now particularly described and ascertained the nature of my said invention and in what manner the same is to be performed, I declare that what I claim is:

1. In a visual indicator for radio apparatus the combination of a panel having an elongated viewing window, a transparent cover plate for said window fixed in position and provided with a correction cursor line extending lengthwise of said window, and a rotatable cylindrical member having a graduated scale line traced several times around its cylindrical surface, said scale line appearing through the viewing window as a plurality of substantially parallel lines which are arranged transversely of the cursor line and intersect the latter at precise frequency adjustments of the radio apparatus.

2. In a visual indicator for radio apparatus the combination of a panel having an elongated viewing window, a transparent cover plate for said window fixed in position and provided with a correction cursor line extending lengthwise of said window, a rotatable cylindrical member having a graduated scale line traced several times around its cylindrical surface, said scale line appearing through the viewing window as a plurality of substantially parallel lines which are arranged transversely of the cursor line and intersect the latter at precise frequency adjustments of the radio apparatus, and a pointer movable lengthwise of the cylindrical member and in synchronism therewith for indicating on which of the parallel lines the precise frequency adjustment of the apparatus is being made.

CHRISTOPHER SYDNEY COCKERELL.